US009171077B2

(12) United States Patent
Balmin et al.

(10) Patent No.: US 9,171,077 B2
(45) Date of Patent: Oct. 27, 2015

(54) SCALING DYNAMIC AUTHORITY-BASED SEARCH USING MATERIALIZED SUBGRAPHS

(75) Inventors: Andrey Balmin, San Jose, CA (US); Heasoo Hwang, La Jolla, CA (US); Erik Nijkamp, Schoenaich (DE); Berthold Reinwald, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1688 days.

(21) Appl. No.: 12/394,371

(22) Filed: Feb. 27, 2009

(65) Prior Publication Data
US 2010/0223266 A1 Sep. 2, 2010

(51) Int. Cl.
G06F 7/00 (2006.01)
G06F 17/30 (2006.01)

(52) U.S. Cl.
CPC ................................ G06F 17/30864 (2013.01)

(58) Field of Classification Search
USPC .......................................................... 707/737
See application file for complete search history.

(56) References Cited

U.S. PATENT DOCUMENTS

| | | | |
|---|---|---|---|
| 6,112,203 A * | 8/2000 | Bharat et al. ................... | 707/102 |
| 6,915,290 B2 | 7/2005 | Bestgen et al. | |
| 7,155,441 B2 | 12/2006 | Rising, III et al. | |
| 7,184,998 B2 | 2/2007 | Nica | |
| 7,406,669 B2 | 7/2008 | Lindberg | |
| 7,698,267 B2 * | 4/2010 | Papakonstantinou et al. ........................ | 707/999.005 |
| 2003/0220928 A1 | 11/2003 | Durand et al. | |
| 2004/0220923 A1 | 11/2004 | Nica | |
| 2006/0074870 A1 | 4/2006 | Brill et al. | |
| 2006/0122993 A1 | 6/2006 | Dettinger et al. | |
| 2007/0124291 A1 | 5/2007 | Hassan et al. | |
| 2007/0192306 A1 | 8/2007 | Papakonstantinou et al. | |
| 2007/0239694 A1 | 10/2007 | Singh et al. | |
| 2008/0243811 A1 | 10/2008 | He et al. | |
| 2008/0281821 A1 | 11/2008 | Chen et al. | |
| 2010/0223266 A1 * | 9/2010 | Balmin et al. ................ | 707/748 |

OTHER PUBLICATIONS

Vazhkudai, Sudharshan S. et al., "Constructing Collaborative Desktop Storage Caches for Large Scientific Datasets", Aug. 2006, ACM Transactions on Storage, vol. 2, No. 3.*
Beyer, Kevin et al., "On Synopses for Distinct-Value Estimation Under Multiset Operations", Jun. 2007, SIGMOD'07, ACM.*
U.S. Appl. No. 12/053,597, filed Mar. 22, 2008, Balmin et al.
Assman, U., "Graph Rewrite System for Program Optimization," ACM Transactions on Programming Languages and Systems, vol. 22(4): 583-637 (Jul. 2000).
Hwang, H., "Information Discovery in Loosely Integrated Data," IBM Almaden Reseach Center, Sigmod 2007, Jun. 12-14, 2007, Bejing, China.
Lee, C., "Optimizing Large Join Queries Using a Graph Based Approach," IEEE Transactions on Knowledge and Data Engineering. vol. 13(2): 298-315 (Mar./Apr. 2001).
Hwang, H., "ObjectRank: A System for Authority-Based Search on Databases," SIGMOD 2006, Jun. 27-29, 2006. Chicago, Illinois.
Balmin, A., "ObjectRank: Authority-Based Keyword Search in Databases," $30^{th}$ VLDB Conference, 2004, Toronto, Canada.

* cited by examiner

Primary Examiner — Alex Gofman
Assistant Examiner — Muluemebet Gurmu
(74) Attorney, Agent, or Firm — Jeffrey T. Holman

(57) ABSTRACT

According to one embodiment of the present invention, a method for processing a query is provided. The method includes generating a set of pre-computed materialized sub-graphs from a dataset and receiving a search query having one or more search query terms. A particular one of the pre-computed materialized sub-graphs is accessed and a dynamic authority-based keyword search is executed on the particular one of the pre-computed materialized sub-graphs. Nodes in the dataset are then retrieved based on the executing, and a response to the search query is provided which includes the retrieved nodes.

7 Claims, 5 Drawing Sheets

PackTermsIntoBins
Input: A set of workload terms $W$, with their posting lists
Output: A set of bins B

```
( 1) while W is not empty {
( 2)    create a new empty bin b
( 3)    create an empty cache of candidate terms C
( 4)    pick terms t ∈ W with the largest positing list size | t |
( 5)    while t is not null {
( 6)       add t to b, and remove it from W
( 7)       compute a set of terms T that co-occur with t
( 8)       for each t' ∈ T {
( 9)          insert (or update) mapping < t', null > into C
(10)       }
(11)       bestI :=0
(12)       for each mapping < c, i > ∈ C {
(13)          If i = null { // b ∩ c has not been computed yet
(14)             i = | b ∩ c |
(15)             Update mapping < c, i > in C
(16)          }
(17)          union :=|b| + |c| - i
(18)          if union > maxBinSize {
(19)             Remove < c, i > from C
(20)          }
(21)          else if I > bestI {
(22)             bestI := i
(23)             t := c
(24)          }
(25)       }
(26)       if bestI = 0 { // no candidates left
(27)          pick t ∈ W with maximum | t | ≤ maxBinSize - | b |
(28)          if no such t exists, t := null
(29)       }
(30)    }
(31)    add completed b to B
(32) }
```

FIG. 1

SCALING DYNAMIC AUTHORITY-BASED SEARCH USING MATERIALIZED SUBGRAPHS

BACKGROUND

The present invention relates to keyword search systems, and more specifically, to dynamic authority-based keyword search systems.

A variety of algorithms are in use for keyword searches in databases and on the Internet. Dynamic, authority-based search algorithms, leverage semantic link information to provide high quality, high recall search results. For example, the PageRank algorithm utilizes the Web graph link structure to assign global importance to Web pages. It works by modeling the behavior of a "random web surfer" who starts at a random web page and follows outgoing links with uniform probability. The PageRank score is independent of a keyword query. Recently, dynamic versions of the PageRank algorithm have been developed. They are characterized by a query-specific choice of the random walk starting points. Two examples are Personalized PageRank for Web graph datasets and ObjecTRank for graph-modeled databases.

Personalized Page Rank is a modification of PageRank that performs search personalized on a preference set that contains web pages that a user likes. For a given preference set, PPR performs an expensive fixpoint iterative computation over the entire Web graph, while it generates personalized search results.

ObjectRank extends Personalized PageRank to perform keyword search in databases. ObjectRank uses a query term posting list as a set of random walk starting points, and conducts the walk on the instance graph of the database. The resulting system is well suited for "high recall" search, which exploits different semantic connection paths between objects in highly heterogeneous datasets. ObjectRank has successfully been applied to databases that have social networking components, such as bibliographic data and collaborative product design.

SUMMARY

According to one embodiment of the present invention, a method comprises: generating a set of pre-computed materialized sub-graphs from a dataset by: grouping all terms in said dataset; and for each group, executing a dynamic random-walk based search over the full dataset using terms in said group as random walk starting points; based on said executing, identifying important nodes; and using said nodes to construct a corresponding sub-graph; receiving a search query having at least one search query term; accessing a particular one of said pre-computed materialized sub-graphs; executing a dynamic authority-based keyword search on said particular one of said pre-computed materialized sub-graphs; retrieving nodes in said dataset based on said executing; and responding to said search query with results including said retrieved nodes.

According to another embodiment of the present invention, a method comprises: generating a set of pre-computed materialized sub-graphs; receiving a search query having a search query term; in response to the receiving, accessing a set of pre-computed materialized sub-graphs; wherein the accessing comprises: accessing the text index based on the search query term to retrieve the corresponding term group identifier; and accessing the corresponding materialized sub-graph based on the term group identifier; executing a dynamic random-walk based search on only the corresponding materialized sub-graph; based on the executing, retrieving nodes in the dataset; and transmitting the nodes as results of the query.

According to a further embodiment of the present invention, a system comprises: a text index; a materialized sub-graph storage unit; a pre-processing unit comprising: a greedy bin algorithm unit for partitioning a workload into a set of bins composed of frequently co-occurring terms; a first dynamic authority-based keyword search unit for performing search operation on the partitioned bins; and a materialized sub-graph generator for receiving a data graph and an output from the dynamic authority-based keyword search unit and constructing a sub-graph for storing in the materialized sub-graph storage unit; and a query processing unit comprising: a query dispatcher unit for receiving a query and a posting list from the text index and generating a query baseset and bin ID; a materialized sub-graph cache for receiving the query baseset and bin ID and serializing materialized sub-graphs from the materialized sub-graph storage unit and also for generating an instance of the serialized materialized sub-graph; and a second dynamic authority-based keyword search unit for performing a search operation on the materialized sub-graph and generating a top K result as a response to the query.

According to another embodiment of the present invention, a computer program product for processing a query comprises: a computer usable medium having computer usable program code embodied therewith, the computer usable program code comprising: computer usable program code configured to: generate a set of pre-computed materialized sub-graphs from a dataset; receive a search query having at least one search query term; access a particular one of the pre-computed materialized sub-graphs; execute a dynamic authority-based keyword search on the particular one of the pre-computed materialized sub-graphs; retrieve nodes in the dataset based on the executing; and respond to the search query with results including the retrieved nodes.

BRIEF DESCRIPTION OF THE SEVERAL VIEWS OF THE DRAWINGS

FIG. 1 shows a bin computation process in accordance with an embodiment of the invention;

DETAILED DESCRIPTION

Figure 2:
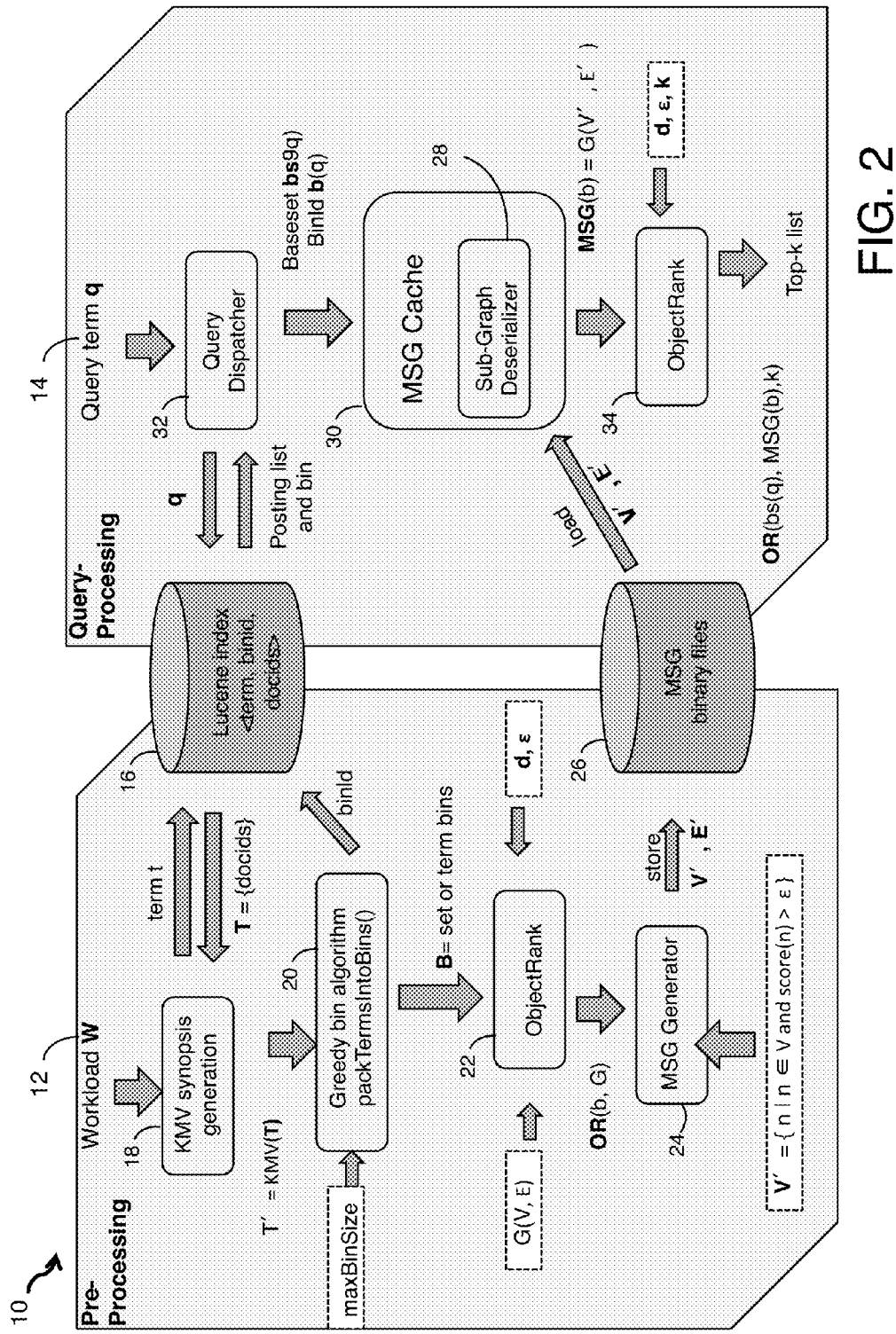
FIG. 2 shows the architecture of a BinRank system 10 in accordance with an embodiment of the invention.

Embodiments of the invention provide a practical solution for scalable dynamic authority-based ranking. The above-discussed Personalized Page Rank and ObjectRank algorithms both suffer from scalability issues. Personalized Page Rank performs an expensive fixpoint iterative computation over the entire Web graph. ObjectRank requires multiple iterations over all nodes and links of the entire database graph. The original ObjectRank system has two modes: on-line and off-line. The on-line mode runs the ranking algorithm once the query is received, which takes too long on large graphs. For example, on a graph of articles of English Wikipedia[1] with 3.2 million nodes and 109 million links, even a fully optimized in-memory implementation of ObjectRank takes 20-50 seconds to run. In the off-line mode, ObjectRank precomputes top-k results for a query workload in advance. This precomputation is very expensive and requires a lot of storage space for precomputed results. Moreover, this approach is not feasible for all terms outside the query workload that a user may search for, i.e. for all terms in the dataset dictionary. For example, on the same Wikipedia dataset, the full dictionary precomputation would take about a CPU-year.

Embodiments of the present invention employ a hybrid approach where query time can be traded off for pre-processing time and storage, referred to as BinRank. BinRank closely approximates ObjectRank scores by running the same ObjectRank algorithm on a small sub-graph, instead of the full data graph. The sub-graphs are precomputed offline. The precomputation can be parallelized with linear scalability. For example, on the full Wikipedia dataset, BinRank can answer any query in less than one second, by precomputing about a thousand sub-graphs, which takes only about 12 hours on a single CPU.

Query execution in accordance with the invention easily scales to large clusters by distributing the sub-graphs between the nodes of the cluster. This way, more sub-graphs can be kept in RAM, thus decreasing the average query execution time. Since the distribution of the query terms in a dictionary is usually very uneven, the throughput of the system is greatly improved by keeping duplicates of popular sub-graphs on multiple nodes of the cluster. The query term is routed to the least busy node that has the corresponding sub-graph.

There are two dimensions to the sub-graph precomputation problem: (1) how many sub-graphs to precompute, and (2) how to construct each sub-graph that is used for approximation. The embodiments of the invention use an approach based on the idea that a sub-graph that contains all objects and links relevant to a set of related terms should have all the information needed to rank objects with respect to one of these terms. For (1), we group all terms into a small number (around 1,000 in case of Wikipedia) of "bins" of terms based on their co-occurrence in the entire dataset. For (2), we execute ObjectRank for each bin using the terms in the bins as random walk starting points and keep only those nodes that receive non-negligible scores.

In particular, the invention approximates ObjectRank by using Materialized Sub-Graphs (MSG), which can be precomputed off-line to support on-line querying for a specific query workload, or the entire dictionary. Also, the invention uses ObjectRank itself to generate MSGs for "bins" of terms. In addition, embodiments of the invention use a greedy algorithm that minimizes the number of bins by clustering terms with similar posting lists.

The scalability of ObjectRank is improved with embodiments of the invention, while still maintaining the high quality of top-K result lists. ObjectRank performs top-K relevance search over a database modeled as a labeled directed graph. The data graph G(V, E) models objects in a database as nodes, and the semantic relationships between them as edges. A node v∈V contains a set of keywords and its object type. For example, a paper in a bibliographic database can be represented as a node containing its title and labeled with its type, "paper". A directed edge e∈E from u to v is labeled with its relationship type $\lambda(e)$. For example, when a paper u cites another paper v, ObjectRank includes in E an edge e=(u→v), that has a label "cites". It can also create a "cited by"-type edge from v to u. In ObjectRank, the role of edges between objects is the same as that of hyperlinks between web pages in PageRank. However, notice that edges of different edge types may transfer different amounts of authority. By assigning different edge weights to different edge types, ObjectRank can capture important domain knowledge such as "a paper cited by important papers is important, but citing important papers should not boost the importance of a paper". Let w(t) denote the weight of edge type t. ObjectRank assumes that weights of edge types are provided by domain experts.

Details regarding ObjectRank may be found at Balmin et al., "ObjectRank: Authority-based keyword search in Databases", Proceedings of the 30th Very Large Database (VLDB) Conference, Toronto, Canada, 2004, the contents of which are incorporated herein by reference in its entirety for all purposes and uses. It is noted that ObjectRank does not need to calculate the exact full ObjectRank vector r to answer a top-K keyword query (K<<|V|). Also, it is noted that there are three important properties of ObjectRank vectors that are directly relevant to the result quality and the performance of ObjectRank. First, for many of the keywords in the corpus, the number of objects with non-negligible ObjectRank values is much less than |V|. This means, that just a small portion of G is relevant to a specific keyword. An ObjectRank value of v, r(v), is non-negligible if r(v) is above the convergence threshold. The intuition for applying the threshold is that differences between the scores that are within the threshold of each other are noise after ObjectRank execution. Thus, scores below threshold are effectively indistinguishable from zero, and objects that have such scores are not at all relevant to the query term.

Second, we observed that top-K results of any keyword term t generated on sub-graphs of G composed of nodes with non-negligible ObjectRank values, with respect to the same t, are very close to those generated on G. Third, when an object has a non-negligible ObjectRank value for a given baseset $BS_1$, it is guaranteed that the object gains a non-negligible ObjectRank score for another baseset $BS_2$ if $BS_1 \subseteq BS_2$. Thus, a sub-graph of G composed of nodes with non-negligible ObjectRank values, with respect to a union of basesets of a set of terms, could potentially be used to answer any one of these terms.

Based on the above observations, we speed up the ObjectRank computation for query term q, by identifying a sub-graph of the full data graph that contains all the nodes and edges that contribute to the accurate ranking of the objects with respect to q. Ideally, every object that receives a non-zero score during the ObjectRank computation over the full graph should be present in the sub-graph and should receive the same score. In reality, however, ObjectRank is a search system that is typically used to obtain only the top-K result list. Thus, the sub-graph only needs to have enough information to produce the same top-K list. Such a sub-graph will be called a Relevant Sub-Graph (RSG) of a query.

Definition 1: The top-K result list of the ObjectRank of keyword term t on data graph G(V, E), denoted OR(t, G, k), is a list of k objects from V sorted in descending order of their ObjectRank scores with respect to a baseset that is the set of all objects in V that contain keyword term t.

Definition 2: A Relevant Sub-Graph (RSG(t, G, k)) of a data graph G(V, E) with respect to a term t and a list size k is a graph $G_s$ ($V_s$, $E_s$), such that $V_s \subset V$, $E_s \subset E$, and $\tau OR(t, G, k) = OR(t, G_s, k)$.

It is hard to find an exact RSG for a given term, and it is not feasible to precompute one for every term in a large workload. However, the present invention introduces a method to closely approximate RSGs. Furthermore, it can be observed that a single sub-graph can serve as an approximate RSG for a number of terms, and also that it is quite feasible to construct a relatively small number of such sub-graphs that collectively cover, i.e. serve as approximate RSGs, all the terms that occur in the dataset.

Definition 3: An Approximate Relevant Sub-Graph (ARSG(t, G, k, c)) of a data graph G(V, E) with respect to a term t, list size k, and confidence limit c∈[0, 1], is a graph $G_s$ ($V_s, E_s$), such that $V_s \subset V$, $E_s \subset E$, and τ (OR(t, G, k), OR(t, Gs, k))>c.

Kendall's τ is a measure of similarity between two lists of. This measure is commonly used to describe the quality of approximation of top-K lists of exact ranking ($R_E$) and approximate ranking ($R_A$) that may contain ties (nodes with equal ranks). A pair of nodes that is strictly ordered in both lists is called concordant if both rankings agree on the ordering, and discordant otherwise. A pair is e-tie, if $R_E$ does not order the nodes of the pair, and a-tie, if $R_A$ does not order them. Let C, D, E, and A denote the number of concordant, discordant, e-tie, and a-tie pairs respectively. Then, Kendall's τ similarity between two rankings, $R_E$ and $R_A$, is defined as $$\tau(R_E, R_A) = \frac{C - D}{\sqrt{(M - E)(M - A)}},$$

where M is the total number of possible pairs, $$M = \frac{n(n-1)}{2}$$

and n=|$R_E, \subset R_A$|. We linearly scale τ to [0, 1] interval.

Definition 4: An ARSG cover of a data graph G(V, E), with respect to a keyword term workload W, list size k, and confidence limit c∈[0, 1] is a set of graphs Γ, such that for every term t∈W, there exists $G_s$∈Γ that is ARSG(t, G, k, c), and inversely every $G_s$∈Γ is an ARSG(t, G, k, c) for at least one term t∈W.

An ARSG may be constructed for term t by executing ObjectRank with some set of objects B as the baseset and restricting the graph to include only nodes with non-negligible ObjectRank scores, i.e. those above the convergence threshold ∈, of the ObjectRank algorithm. Sub-graphs constructed in this way are referred to as Materialized Sub-Graphs for set B, denoted MSG(B).

The main challenge of this approach is identifying a baseset B, which will provide a good RSG approximation for term t. Embodiments of the invention focus on sets B, which are supersets of the baseset of t. This relationship gives us the following important result.

Theorem 1: If $BS_1 \subset BS_2$, then (v∈MSG($BS_1$)⇒ v∈MSG($BS_2$)).

According to this theorem, for a given term t, if the term baseset BS(t) is a subset of B, all the important nodes relevant to t are always subsumed within MSG(B). That is, all the non-negligible end points of random walks originated from starting nodes containing t are present in the sub-graph generated using B.

However, it may be observed that even though two nodes $v_1$ and $v_2$ are guaranteed to be found both in G and in MSG(B), the ordering or their ObjectRank scores might not be preserved on MSG(B) as we do not include intermediate nodes if their ObjectRank scores are below the convergence threshold. Missing intermediate nodes could deteriorate the quality of ObjectRank scores computed on MSG(B). However, it is unlikely that many walks terminating on relevant nodes will pass through irrelevant nodes. Thus, even if MSG(B, G) is not an RSG(t, G, k), it is very likely to be ARSG(t, G, k, c) with high confidence c. Experimental evaluations performed by the inventors support this intuition.

The quality of search results should improve if objects in B are semantically related to t. In fact, the inventors have discovered that terms with strong semantic connections can generate good RSGs for each other. For example, in tests on the Digital Bibliography and Library Project (DBLP) dataset, the inventors have observed that OR("xml", G, 10)=OR("xml", RS G("schema"), 10). In other words, the top-10 result list of query "xml" on the full DBLP graph with about 1.4 million nodes is identical (same objects in the same order) to the top-10 list of query "xml" on the graph of 49956 nodes, which have non-zero rank with respect to query "schema". At first glance, this is surprising as only 7% of documents that contain the term "xml" also contain the term "schema". However, there is definitely a strong semantic connection between these terms, since XML is a data format famous for its flexible schema. Papers about XML tend to cite papers that talk about schemas and vice versa. Thus, a summary graph generated from ObjectRank results for "schema" contains enough information to answer a keyword search on "xml".

It can be hard to automatically identify terms with such strong semantic connections for every query term. In embodiments of the invention, MSGs are constructed by clustering all the terms of the dictionary, or of a query workload if one is available, into a set of term "bins". A baseset B is created for every bin by taking the union of the posting lists of the terms in the bin, and construct MSG(B) for every bin. The mapping of terms to bins is remembered, and at query time, the corresponding bin for each term can be uniquely identified, and the term can be executed on the MSG of this bin.

Due to Theorem 1, the bin's MSG will be an ARSG for each term in the bin with fairly high confidence. Thus, the set of all bin MSGs is very likely to be an ARSG cover with sufficiently high confidence. Empirical results support this. For example, after a reasonable tuning of parameter settings (e=0.0005 and maximum B size of 4000 documents), 90% of random workload terms ran on their respective bin MSGs with τ (OR(t, G, 100), OR(t, MSG, 100))>0.9. Moreover, the other 10% of terms, which had $\tau_{100}$<0.9, were all very infrequent terms. The most frequent among them appeared in 8 documents. $\tau_{100}$ tends to be relatively small for infrequent terms, because there simply may not be 100 objects with meaningful relationships to the baseset objects.

As previously discussed, a set of MSGs is constructed for terms of a dictionary or a workload by partitioning the terms into a set of term bins based on their co-occurrence. An MSG is generated for every bin based on the intuition that a sub-graph that contains all objects and links relevant to a set of related terms should have all the information needed to rank objects with respect to one of these terms.

There are two main goals in constructing term bins. The first goal is controlling the size of each bin to ensure that the resulting sub-graph is small enough for ObjectRank to execute in a reasonable amount of time. The second goal is minimizing the number of bins to save the pre-processing time. We know that pre-computing ObjectRank for all terms in our corpus is not feasible.

To achieve the first goal, a maxBinSize parameter is introduced that limits the size of the union of the posting lists of the terms in the bin, called bin size. As discussed above, ObjectRank uses the convergence threshold that is inversely proportional to the size of the baseset, i.e., the bin size in case of sub-graph construction. Thus, there is a strong correlation between the bin size and the size of the materialized sub-graph. It can be shown that the value of maxBinSize should be determined by quality and performance requirements of the system.

The problem of minimizing the number of bins is NP-hard. In fact, if all posting lists are disjoint, this problem reduces to a classical NP-hard bin packing problem. Embodiments of the invention apply a greedy algorithm that picks an unassigned term with the largest posting list to start a bin and loops to add the term with the largest overlap with documents already in the bin. We use a number of heuristics to minimize the required number of set intersections, which dominate the complexity of the algorithm. The tight upper bound on the number of set intersections that the algorithm needs to perform is the number of pairs of terms that co-occur in at least one document. To speed-up the execution of set intersections for larger posting lists, KMV synopses may be used to estimate the size of set intersections.

FIG. 1 shows a bin computation process in accordance with an embodiment of the invention. This process works on term posting lists from a text index. As the process fills up a bin, it maintains a list of document IDs, that are already in the bin, and a list of candidate terms, that are known to overlap with the bin (i.e. their posting lists contain at least one document, that was already placed into the bin). This bin computation implements a greedy algorithm which picks a candidate term with a posting list that overlaps the most with documents already in the bin, without the posting list union size exceeding the maximum bin size.

While it is more efficient to prepare bins for a particular workload that may come from a system query log, it is may not necessarily be assumed that a query term that has not been seen before, will not be seen in the future. It can be demonstrated that it is feasible to use the entire dataset dictionary as the workload, in order to be able to answer any query.

Due to caching of candidate intersection results in lines 12-14 of the process in FIG. 1, the upper bound on the number of set intersections performed by this process is the number of pairs of co-occurring terms in the dataset. Indeed, in the worst case, for every term t that has just been placed into the bin, we need to intersect the bin with every term t' that co-occurs with t, in order to check if t' is subsumed by the bin completely, and can be placed into the bin "for free".

For example, consider N terms with posting lists of size X each, that all co-occur in one document $d_0$ with no other co-occurrences. If the maximum bin size is $2(X-1)$, a bin will have to be created for every term. However, to get to that situation, the bin computation process will have to check intersections for every pair of terms. Thus, the upper bound on the number of intersections is tight.

In fact, it can be seen from the above example that no algorithm that packs the bins based on the maximum overlap can do so with fewer than N (N−1)/2 set intersections in the worst case. Fortunately, real-world text databases have structures that are far from the worst case.

FIG. 2 shows the architecture of a BinRank system 10 in accordance with an embodiment of the invention. During a pre-processing stage, a query pre-processor 12 generates MSGs, as defined above. During a query processing stage, a query processor 14 executes the ObjectRank process on the sub-graphs instead of the full graph and produces high quality approximations of top-K lists, at a small fraction of the cost. In order to save pre-processing cost and storage, each MSG is designed to answer multiple term queries. We observed in the Wikipedia dataset that a single MSG can be used for 330 to 2000 terms, on average.

The query pre-processor 12 of the BinRank system 10 starts with a set of workload terms W for which MSGs will be materialized. If an actual query workload is not available, W includes the entire set of terms found in the corpus. All terms with posting lists longer than a system parameter maxPostingList are excluded. The posting lists of these terms are deemed too large to be packed into bins. ObjectRank is executed for each such term individually, and the resulting top-K lists are stored.

The maxPostingList should be tuned so that there are relatively few of these frequent terms. In the case of Wikipedia, the inventors used maxPostingList=2000 and only 381 terms out of about 700000 had to be pre-computed individually. This process took 4.6 hours on a single CPU.

For each term w∈W, the BinRank system 10 includes a KMV synopsis unit 18 that reads a posting list T from a Lucene index 16 and creates a KMV synopsis T' that is used to estimate set intersections.

A greedy bin algorithm unit 20 using the above-discussed bin construction process, packTermsIntoBins( ) partitions W into a set of bins composed of frequently co-occurring terms. This process takes a single parameter maxBinSize, which limits the size of a bin posting list, i.e. the union of posting lists of all terms in the bin. During the bin construction process, the BinRank system 10 stores the bin identifier of each term into the Lucene index 16 as an additional field. This allows the system to map each term to the corresponding bin and MSG at query time.

An ObjectRank module 22 takes as input a set of bin posting lists B and the entire graph G(V, E) with a set of ObjectRank parameters, the damping factor d and the threshold value ϵ. The threshold determines the convergence of the algorithm as well as the minimum ObjectRank score of MSG nodes.

The ObjectRank system 10 stores a graph as a row-compressed adjacency matrix. In this format, the entire Wikipedia graph consumes 880 MB of storage, and can be loaded into main memory for MSG generation. In case that the entire data graph does not fit in main memory, the system 10 can apply parallel PageRank computation techniques, such as hyper-graph partitioning schemes.

An MSG generator 24 takes the graph G and the ObjectRank result with respect to a term bin b, and then constructs a sub-graph $G_b$(V', E') by including only nodes with $r^r(u) > \epsilon_b$. $\epsilon_b$ is the convergence threshold of b, that is ϵ/|BS(b)|. Given the set of MSG nodes V', the corresponding set of edges E' is copied from the in-memory copy of G. The edge construction takes 1.5-2 seconds for a typical MSG with about 5 million edges.

Once the MSG is constructed and stored in MSG storage 26, it is serialized to a binary file on disk in the same row-compressed adjacency matrix format to facilitate fast deserialization. The serialization takes place in a sub-graph serializer 28 within an MSG cache module 30. It has been observed that de-serializing a 40 MB MSG on a single SATA disk drive takes about 0.6 seconds. In general, deserialization speed can be greatly improved by increasing the transfer rate of the disk subsystem.

For a given keyword query q, a query dispatcher 32 retrieves from the Lucene index 16 the posting list bs(q) (used as the baseset for the ObjectRank execution) and the bin identifier b(q). Given a bin identifier, the MSG cache module 30 determines whether the corresponding MSG is already in memory. If it is not, the MSG deserializer 28 reads the MSG representation from the MSG storage 26. The BinRank query processor 14 uses all available memory as a least recently used (LRU) cache of MSGs.

For smaller data graphs, it is possible to dramatically reduce MSG storage requirements by storing only a set of MSG nodes V', and generating the corresponding set of edges E' only at query time. However, in the Wikipedia dataset that would introduce an additional delay of 1.5-2 seconds, which may not be acceptable in a keyword search system.

A second ObjectRank module 34 gets the in-memory instance of MSG, the baseset, and a set of ObjectRank calibrating parameters: (i) the damping factor d, (ii) the convergence threshold $\in$, and (iii) the number of top-k list entries k. Once the ObjectRank scores are computed and sorted, the resulting document ids are used to retrieve and present the top-k objects to the user.

One of the advantages of BinRank query processor 14 is that it can easily utilize large clusters of nodes. In this case, MSGs may be distributed between the nodes and the Hadoop Java software may be employed to start an MSG cache and an ObjectRank engine Web service on every node. A set of dispatcher processes, each with its own replica of the Lucene index, may route the queries to the appropriate nodes.

Figure 3:
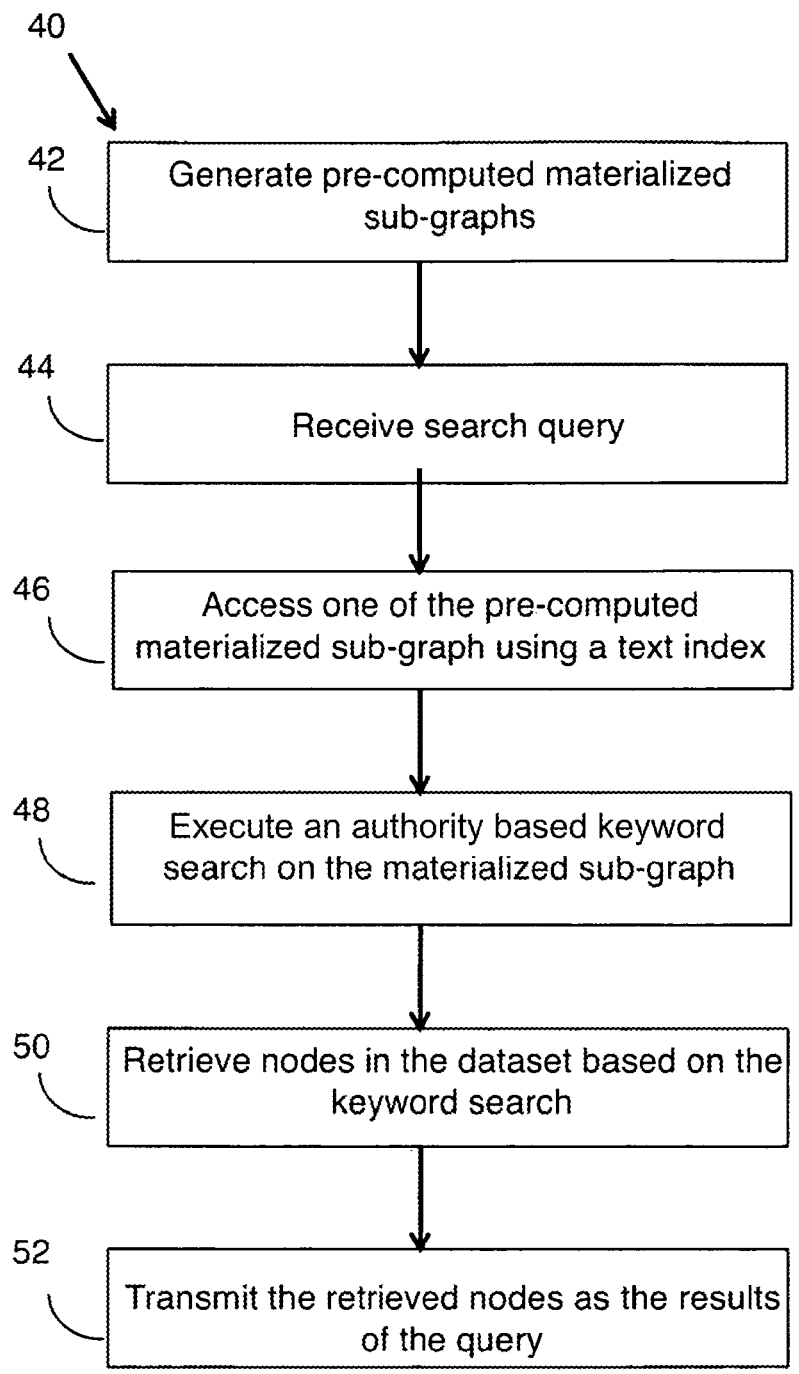
FIG. 3 shows a flowchart of a method for query processing in accordance with an embodiment of the invention.

FIG. 3 shows a flowchart of a method 40 for query processing in accordance with an embodiment of the invention. In block 42 materialized sub-graphs are pre-computed. A search query is then received in block 44 and one of the pre-computed materialized sub-graphs is accessed using a text index, in block 46. In block 48, an authority-based keyword search is executed on the materialized sub-graph. In block 50, nodes are retrieved from the dataset based on the keyword search. The retrieved nodes are transmitted as the results of the query in block 52.

Figure 4:
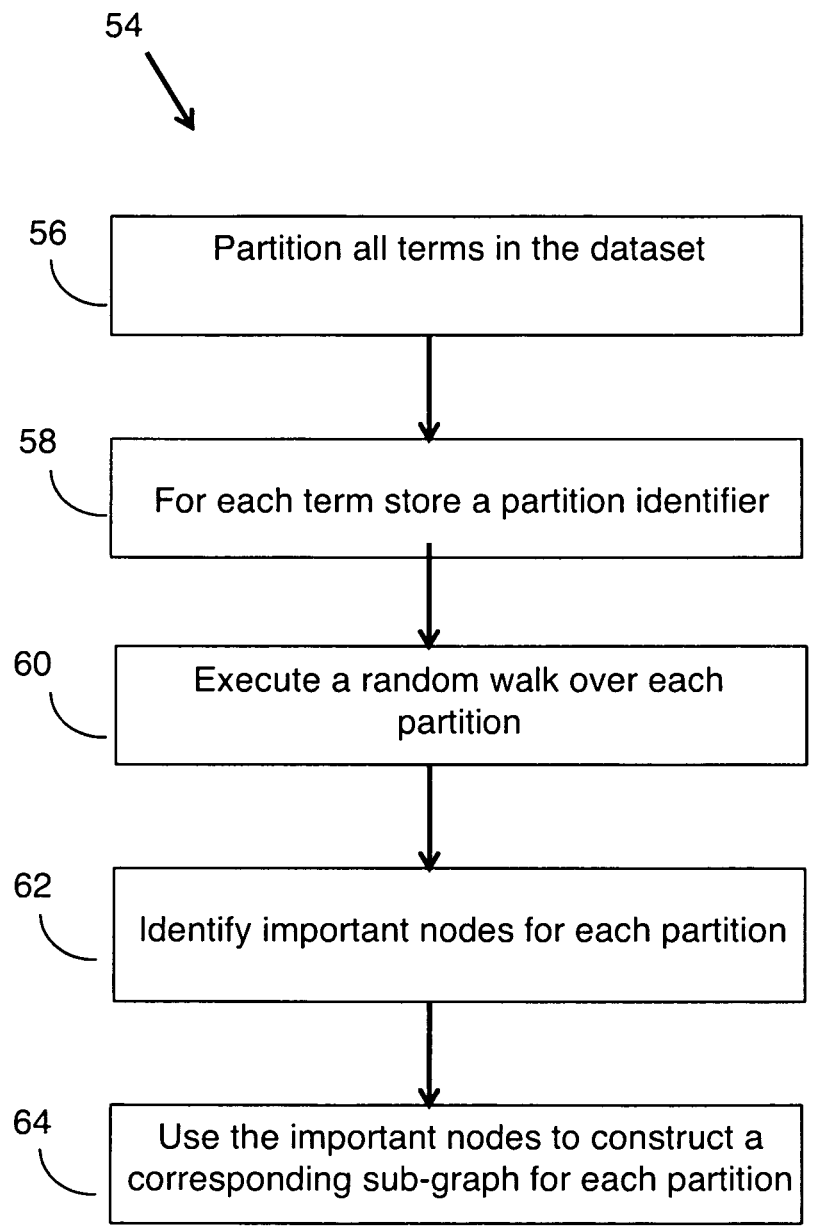
FIG. 4 shows a flowchart of a process for generating pre-computed materialized sub-graphs in accordance with an embodiment of the invention.

FIG. 4 shows a flowchart of a process 54 for generating pre-computed materialized sub-graphs in accordance with an embodiment of the invention. In block 56, all terms in the dataset are partitioned. A partition identifier is stored for each term, in block 58. A random walk is then executed over each partition in block 60. In block 62, important nodes are identified for each partition based on the random walk. The important nodes are used to construct a corresponding sub-graph for each partition in block 64.

As can be seen from the above disclosure, embodiments of the invention provide a practical solution for scalable dynamic authority-based ranking. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
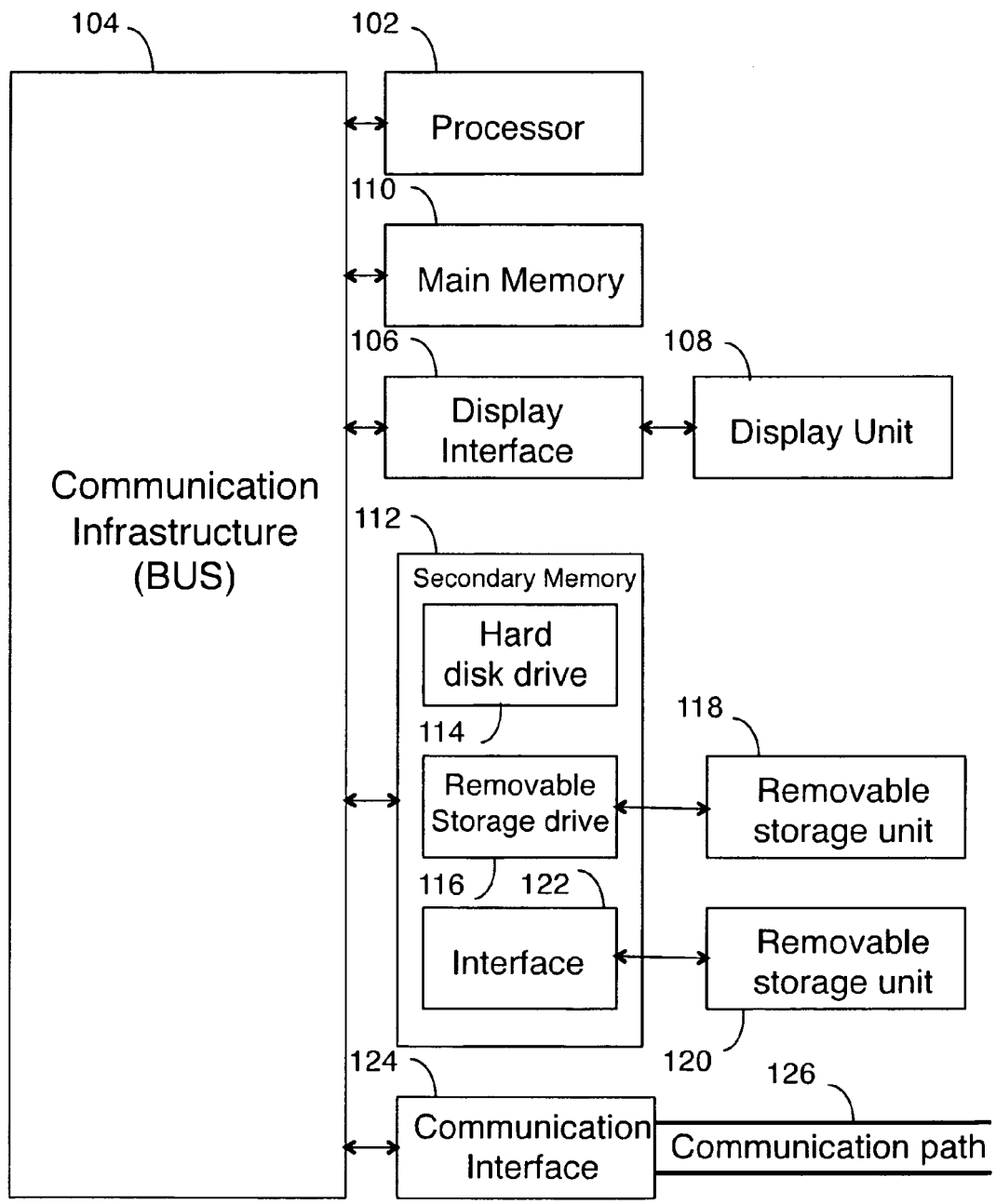
FIG. 5 shows a high level block diagram of an information processing system useful for implementing one embodiment of the present invention.

FIG. 5 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124.

These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method comprising:
  generating, in a query pre-processor, a set of pre-computed materialized sub-graphs from a dataset by:
    grouping all terms in said dataset; and for each group, executing a dynamic random-walk based search over the full dataset using terms in said group as random walk starting points;
based on said executing, identifying important nodes; and
using said nodes to construct a corresponding sub-graph;
receiving a search query having at least one search query term;
accessing a particular one of said constructed corresponding sub-graphs;
executing a dynamic authority-based keyword search on said particular accessed sub-graph;
retrieving nodes in said dataset based on said executing; and
responding to said search query with results including said retrieved nodes.

2. A method according to claim 1 wherein said generating further comprises for each term, storing in a field of a text index corresponding term group identifiers.

3. A method according to claim 2 wherein said authority-based keyword search is an ObjectRank algorithm.

4. A method according to claim 2 wherein said authority-based keyword search is a dynamic Personalized PageRank algorithm.

5. A method according to claim 2 wherein said grouping of terms in said dataset comprises grouping based on the co-occurrence of terms in said dataset.

6. A method according to claim 2 wherein said identifying important nodes comprises identifying nodes receiving a non-negligible score during said random walk.

7. A method according to claim 2 wherein said grouping of terms in said dataset is a partitioning.

* * * * *